United States Patent
Costigan et al.

(10) Patent No.: US 7,417,803 B2
(45) Date of Patent: Aug. 26, 2008

(54) FOCUSING MECHANISM FOR A VISION DETECTOR

(75) Inventors: George Costigan, Westford, MA (US);
Steven N. Goodspeed, Westford, MA (US); David R. King, Norfolk, MA (US); Robert J. Tremblay, II, Framingham, MA (US); John F. Keating, Medway, MA (US); Brian S. Phillips, Sherborn, MA (US); James Hoffmaster, Dedham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 520 days.

(21) Appl. No.: 10/991,601

(22) Filed: Nov. 18, 2004

(65) Prior Publication Data

US 2006/0103755 A1 May 18, 2006

(51) Int. Cl.
*G02B 15/14* (2006.01)
*G02B 7/02* (2006.01)
*G02B 7/04* (2006.01)
*G03B 17/00* (2006.01)
*G03B 17/18* (2006.01)

(52) U.S. Cl. .......... 359/694; 359/696; 359/698; 359/823; 396/55; 396/59; 396/75; 396/85; 396/89; 396/91; 396/137; 396/144; 396/147; 348/345

(58) Field of Classification Search ......... 359/694–698, 359/823, 824; 396/55, 56, 59, 85, 89, 91, 396/104, 121, 125, 137, 144, 147, 296, 316; 348/211.5, 143, 335, 345, 360, 349, E5.026, 348/E5.028, E5.029, E5.046; 353/100, 101; 355/59; 250/239

See application file for complete search history.

(56) References Cited

U.S. PATENT DOCUMENTS

| | | | |
|---|---|---|---|
| 3,581,595 A | 6/1971 | Carlson | |
| 3,940,777 A * | 2/1976 | Komine | 396/85 |
| 3,947,860 A | 3/1976 | Imai et al. | |
| 4,057,327 A * | 11/1977 | Kumazawa | 359/696 |
| 4,083,057 A * | 4/1978 | Quinn | 396/78 |
| 4,104,650 A * | 8/1978 | Hosoe et al. | 396/91 |
| 4,299,460 A * | 11/1981 | Hasegawa | 396/137 |
| 5,005,038 A | 4/1991 | Ogawa et al. | |
| 5,092,670 A | 3/1992 | Preston | |
| 5,113,290 A * | 5/1992 | Fletcher | 359/823 |
| RE34,989 E | 7/1995 | Struhs et al. | |
| 5,541,703 A | 7/1996 | Suzuka | |
| 5,801,770 A | 9/1998 | Paff et al. | |
| 5,826,114 A * | 10/1998 | Miyamoto et al. | 396/55 |
| 6,018,426 A * | 1/2000 | Funahashi | 359/819 |
| 6,115,197 A * | 9/2000 | Funahashi | 359/826 |
| 6,292,221 B1 | 9/2001 | Lichtman | |
| 6,453,126 B1 * | 9/2002 | Abe | 396/429 |
| 2005/0275831 A1 | 12/2005 | Silver | |

OTHER PUBLICATIONS

"GEO PresencePlus P4 User's Manual", *Banner Engineering Corp., P/N 121555*, (Mar. 2005), 1-12.
"Legent 510 Data Sheet", *DVT Sensors (Cognex Corporation)*, (2005).
"Plug n' Play Machine Vision with High-End Performance", *Keyence CV-500 Series*, Keyence Corporation, Cat. No. CV501-KA-C,(1999),1-8.

* cited by examiner

*Primary Examiner*—Loha Ben
(74) *Attorney, Agent, or Firm*—Duane H. Dreger

(57) ABSTRACT

A machine vision image acquisition system is provided with a housing or enclosure that protects the acquisition system components from an industrial environment. The machine vision image acquisition system has a focusing mechanism that can be actuated externally to the housing. The focusing mechanism uses a gear drive to transmit externally actuated focus adjustments to the optical components of the acquisition system.

20 Claims, 11 Drawing Sheets

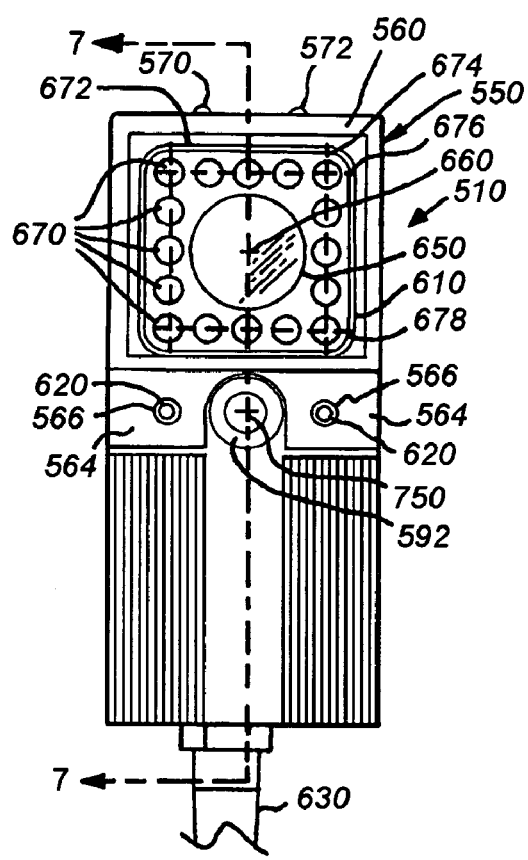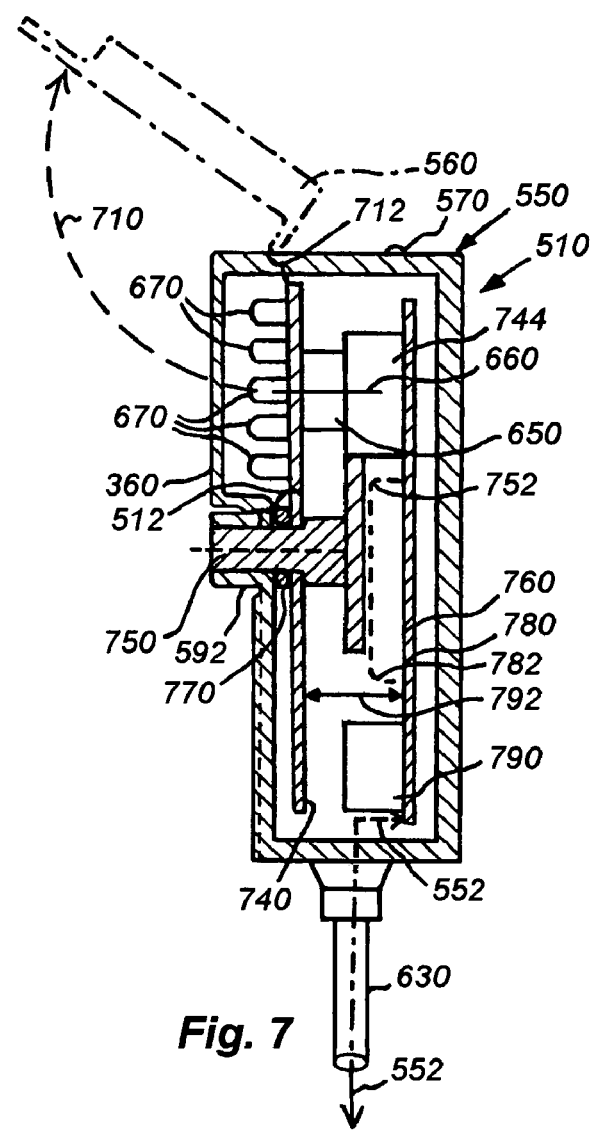
Fig. 6
Fig. 7

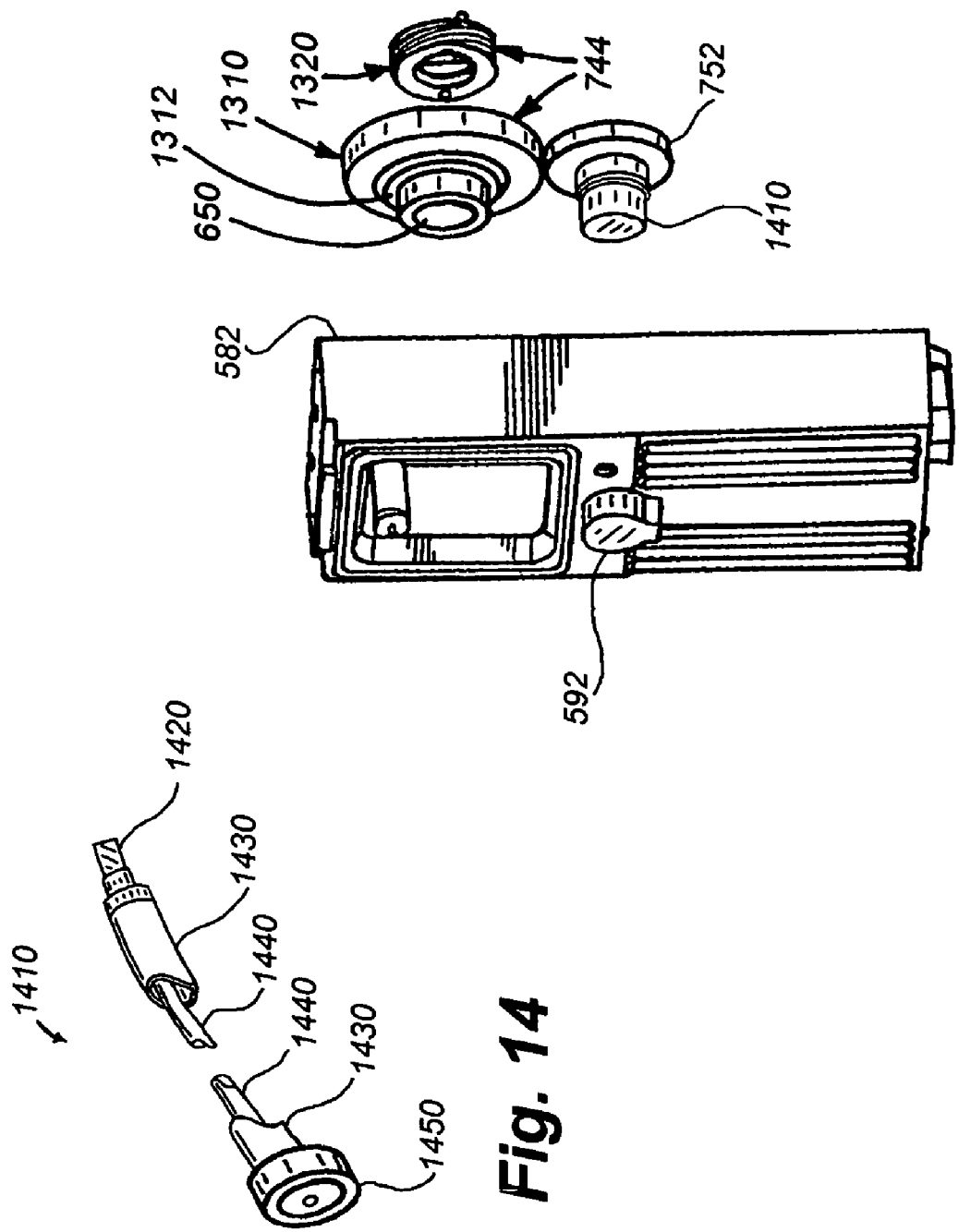

FOCUSING MECHANISM FOR A VISION DETECTOR

BACKGROUND OF THE INVENTION

1. Field of the Invention

This invention relates to industrial machine vision inspection of objects, and more particularly to a focus adjustment mechanism that permits focus adjustment of optical components of a vision detector.

2. Description of the Related Art

Industrial manufacturing relies on automatic inspection of objects being manufactured. One form of automatic inspection that has been in common use for decades is based on optoelectronic technologies that use electromagnetic energy, usually infrared or visible light, photoelectric sensors, and some form of electronic decision making.

One well-known form of optoelectronic automatic inspection uses an arrangement of photodetectors. A typical photodetector has a light source and a single photoelectric sensor that responds to the intensity of light that is reflected by a point on the surface of an object, or transmitted along a path that an object may cross. A user-adjustable sensitivity threshold establishes a light intensity above which (or below which) an output signal of the photodetector will be energized.

One photodetector, often called a gate, is used to detect the presence of an object to be inspected. Other photodetectors are arranged relative to the gate to sense the light reflected by appropriate points on the object. By suitable adjustment of the sensitivity thresholds, these other photodetectors can detect whether certain features of the object, such as a label or hole, are present or absent. A decision as to the status of the object (for example, pass or fail) is made using the output signals of these other photodetectors at the time when an object is detected by the gate. This decision is typically made by a programmable logic controller (PLC), or other suitable electronic equipment.

Automatic inspection using photodetectors has various advantages. Photodetectors are inexpensive, simple to set up, and operate at very high speed (outputs respond within a few hundred microseconds of the object being detected, although a PLC will take longer to make a decision).

Automatic inspection using photodetectors can be difficult since simple sensing of light intensity reflected from a point on the object is often insufficient for inspection. Instead it may be necessary to analyze a pattern of brightness reflected from an extended area. For example, to detect an edge it may be necessary to analyze a pattern of brightness to see if it corresponds to a transition from a lighter to a darker region.

Further, it may be hard to arrange the photodetectors when many points on an object need to be inspected. Each such inspection point requires the use of a separate photodetector that needs to be physically mounted in such a way as to not interfere with the placement of the other photodetectors. Interference may be due to space limitations, crosstalk from the light sources, or other factors.

Manufacturing lines are usually capable of producing a mix of products, each with unique inspection requirements. An arrangement of photodetectors is very inflexible, so that a line changeover from one product to another would require the photodetectors to be physically moved and readjusted. The cost of performing a line changeover, and the risk of human error involved, often offset the low cost and simplicity of the photodetectors.

Using an arrangement of photodetectors requires that objects be presented at known, predetermined locations so that the appropriate points on the object are sensed. This requirement may add additional cost and complexity that can offset the low cost and simplicity of the photodetectors.

Another well-known form of optoelectronic automatic inspection uses a device that can capture a digital image of a two-dimensional field of view in which an object to be inspected is located, and then analyze the image and make decisions. Such a device is usually called a machine vision system, or simply a vision system. The image is captured by exposing a two-dimensional array of photosensitive elements for a brief period, called the integration or shutter time, to light that has been focused on the array by a lens. The array is called an imager and the individual elements are called pixels. Each pixel measures the intensity of light falling on it during the shutter time. The measured intensity values are then converted to digital numbers and stored in the memory of the vision system to form the image, which is analyzed by a digital processing element such as a computer, using methods well-known in the art to determine the status of the object being inspected.

In some cases the objects are brought to rest in the field of view, and in other cases the objects are in continuous motion through the field of view. An event external to the vision system, such as a signal from a photodetector, or a message from a PLC, computer, or other piece of automation equipment, is used to inform the vision system that an object is located in the field of view, and therefore an image should be captured and analyzed. Such an event is called a trigger.

Machine vision systems avoid the disadvantages associated with using an arrangement of photodetectors. They can analyze patterns of brightness reflected from extended areas, easily handle many distinct features on the object, accommodate line changeovers through software systems and/or processes, and handle uncertain and variable object locations.

Machine vision systems have disadvantages compared to an arrangement of photodetectors, including:

- They are relatively expensive, often costing ten times more than an arrangement of photodetectors.
- They can be difficult to set up, often requiring people with specialized engineering training.
- They operate much more slowly than an arrangement of photodetectors, typically requiring tens or hundreds of milliseconds to make a decision. Furthermore, the decision time tends to vary significantly and unpredictably from object to object.

Machine vision systems have limitations that arise because they make decisions based on a single image of each object, located in a single position in the field of view (each object may be located in a different and unpredictable position, but for each object there is only one such position on which a decision is based). This single position provides information from a single viewing perspective, and a single orientation relative to the illumination. The use of only a single perspective often leads to incorrect decisions. It has long been observed, for example, that a change in perspective of as little as a single pixel can in some cases change an incorrect decision to a correct one. By contrast, a human inspecting an object usually moves it around relative to his eyes and the lights to make a more reliable decision.

Also, the limitations of machine vision systems arise in part because they operate too slowly to capture and analyze multiple perspectives of objects in motion, and too slowly to react to events happening in the field of view. Since most vision systems can capture a new image simultaneously with analysis of the current image, the maximum rate at which a vision system can operate is determined by the larger of the capture time and the analysis time. Overall, one of the most significant factors in determining this rate is the number of pixels comprising the imager.

The availability of new low-cost imagers, such as the LM9630 from National Semiconductor of Santa Clara, Calif. that operate at a relatively low-resolution (approximately 100×128 pixels), high frame rate (up to 500 frames per second) and high sensitivity allowing short shutter times with inexpensive illumination (e.g., 300 microseconds with LED illumination), have made possible the implementation of a novel vision detector that employs on-board processors to control machine vision detection and analysis functions. A novel vision detector using such an imager, and overall inspection system employing such a vision detector, is taught in U.S. patent application Ser. No. 10/865,155, entitled METHOD AND APPARATUS FOR VISUAL DETECTION AND INSPECTION OF OBJECTS, by William M. Silver, filed Jun. 9, 2004, and the teachings of which are expressly incorporated herein by reference.

An advantage to the above-incorporated-by-reference detection and inspection METHOD AND APPARATUS is that the vision detector can be implemented within a compact housing that is programmed using a PC or other Human-Machine Interface (HMI) device (via, for example a Universal Serial Bus (USB)), and is then deployed to a production line location for normal runtime operation. The outputs of the apparatus are (in one implementation) a pair of basic High/Low lines indicating detection of the object and whether that object passes or fails based upon the characteristics being analyzed. These outputs can be used (for example) to reject a failed object using a rejection arm mounted along the line that is signaled by the apparatus' output.

By way of example, FIG. 1 shows an illustrative embodiment of a vision detector 100 according to the above-incorporated-by-reference METHOD AND APPARATUS FOR VISUAL DETECTION AND INSPECTION OF OBJECTS inspecting objects on a production line. A conveyor 102 transports objects to cause relative movement between the objects and the field of view of vision detector 100. Objects 110, 112, 114, 116 and 118 are shown. In this example, the objects include exemplary features upon which location and inspection are based, including a label 120 and a hole 124. More particularly, the exemplary vision detector 100 detects the presence of an object by visual appearance and inspects it based on appropriate inspection criteria. If an object is defective (such as the label-less object 116), the vision detector 100 sends a signal via link 150 to a reject actuator 170 to remove the object (116) from the conveyor stream. An encoder 180 operatively related to the motion of the conveyor (or other relative motion) sends a signal 160 to the vision detector 100, which uses it to insure proper delay of signal 150 from the encoder count where the object crosses some fixed, imaginary reference point 190, called the mark point. If an encoder is not used, the delay can be based on time instead.

In an alternate example, the vision detector 100 sends signals to a PLC for various purposes, which may include controlling a reject actuator. In another exemplary implementation, suitable in extremely high-speed applications or where the vision detector cannot reliably detect the presence of an object, a photodetector is used to detect the presence of an object and sends a signal to the vision detector for that purpose. In yet another implementation, there are no discrete objects, but rather material flows past the vision detector continuously—for example a web. In this case the material is inspected continuously, and signals are send by the vision detector to automation equipment, such as a PLC, as appropriate.

Basic to the function of the vision detector 100 in the above-incorporated-by-reference METHOD AND APPARATUS is the ability to exploit the abilities of the imager's quick-frame-rate and low-resolution image capture to allow a large number of image frames of an object passing down the line to be captured and analyzed in real-time. Using these frames, the apparatus' on-board processor can decide when the object is present and use location information to analyze designated areas of interest on the object that must be present in a desired pattern for the object to "pass" inspection.

With brief reference to FIG. 2, a timeline is shown, which illustrates a typical operating cycle for a vision detector in visual event detection mode. A portion 200 of the exemplary timeline corresponds to the inspection of a first object, and contains the capture and analysis of seven frames by the vision detector. A second portion 210 corresponds to the inspection of a second object, and contains five frames.

Boxes labeled "c", such as box 220, represent image capture by the vision detector 100. Boxes labeled "a", such as box 230, represent image analysis. It is desirable that capture "c" of the next image be overlapped with analysis "a" of the current image, so that (for example) analysis step 230 analyzes the image captured in capture step 220. In this timeline, analysis is shown as taking less time than capture, but in general analysis will be shorter or longer than capture depending on the application details. If capture and analysis are overlapped, the rate at which a vision detector can capture and analyze images is determined by the longer of the capture time and the analysis time. This is the "frame rate". The above-incorporated-by-reference METHOD AND APPARATUS allows objects to be detected reliably without a trigger signal, such as that provided by a photodetector.

Each analysis step "a" first considers the evidence that an object is present. Frames where the evidence is sufficient are called active. Analysis steps for active frames are shown with a thick border, for example analysis step 240. In an exemplary implementation, inspection of an object begins when an active frame is found, and ends when some number of consecutive inactive frames are found. In the example of FIG. 2, inspection of the first object begins with the first active frame corresponding to analysis step 240, and ends with two consecutive inactive frames, corresponding to analysis steps 246 and 248. Note that for the first object, a single inactive frame corresponding to analysis step 242 is not sufficient to terminate the inspection.

At the time that inspection of an object is complete, for example at the end of analysis step 248, decisions are made on the status of the object based on the evidence obtained from the active frames. In an exemplary implementation, if an insufficient number of active frames were found then there is considered to be insufficient evidence that an object was actually present, and so operation continues as if no active frames were found. Otherwise an object is judged to have been detected, and evidence from the active frames is judged in order to determine its status, for example pass or fail. A variety of methods may be used to detect objects and determine status within the scope of the invention; some are described below and many others will occur to those skilled in the art. Once an object has been detected and a judgment made, a report may be made to appropriate automation equipment, such as a PLC, using signals well-known in the art. In such a case a report step would appear in the timeline. The example of FIG. 5 corresponds instead to a setup such as shown in FIG. 1, where the vision detector is used to control a downstream reject actuator 170 via signal 150. By considering the position of the object in the active frames as it passes through the field of view, the vision detector 100 estimates the mark time 250 and 252 at which the object crosses the mark point 190 (FIG. 1). Note that in cases where an encoder 180 is used, the mark time is actually an encoder count; the reader will understand that time and count can be used interchangeably. A report 260, consisting of a pulse of appropriate duration to the reject actuator 170, is issued after a precise delay 270 in time or encoder count from the mark time 250.

Note in particular that the report 260 may be delayed well beyond the inspection of subsequent objects such as object 110 (FIG. 1). The exemplary vision detector 100 uses well-known first-in first-out (FIFO) buffer methods to hold the reports until the appropriate time.

Once inspection of an object is complete, the vision detector 100 may enter an idle step 280. Such a step is optional, but may be desirable for several reasons. If the maximum object rate is known, there is no need to be looking for an object until just before a new one is due. An idle step will eliminate the chance of false object detection at times when an object couldn't arrive, and will extend the lifetime of the illumination system because the lights can be kept off during the idle step.

The processor of the exemplary METHOD AND APPARATUS is provided with two types of software elements to use in making its decisions: "Locators" that locate the object and "Detectors" that decide whether an object feature is present or absent. The decisions made by both Locators and Detectors are used to judge whether an object is detected and, if so, whether it passes inspection. In one example, Locators can be simply described as a one-dimensional edge detector in a region of interest. The vision detector is configured for locating objects by placing Locators at certain positions in an image where an edge feature of the object can be seen when the object is in the field of view. The Locator can be oriented with respect to the direction the object is moving, and sized to ensure that the edge feature of the object can be located at multiple positions while in the field of view. During analysis, the location of the edge feature of the object within the Locator can be reported, as well as a logical output state that the location is known.

Detectors are vision tools that operate on a region of interest that produce a logical output state that detects the presence or absence of features in an image of the object. The vision detector is configured for detecting features of an object by placing Detectors at certain positions in an image where object features can be seen when the object is located by the Locators. Various types of Detectors can be used, such as Brightness Detectors, Edge Detectors, and Contrast Detectors.

Detectors can be linked to the location of the feature determined by a Locator to further refine the presence detection and inspection of the object. Accordingly, in each frame where the object may be viewed at a different perspective, the location of the object determined by the Locator will be different, and the position of the Detectors in the image can be moved according to the location determined by the Locator. The operation of the vision detector at high frame rates, therefore permits the vision detector to capture and analyze multiple images of the object while it passes through the field of view.

The above-discussion of Locators and Detectors is further illustrated by way of example in FIGS. 3 and 4. FIG. 3, thus, represents an image of the object 110 from FIG. 1, containing label feature 120 and hole feature 124, with superimposed graphics (termed "Photos" in the above-incorporated METHOD AND APPARATUS) representing a region of the frame whose output can be used to base decisions and is displayed (at appropriate time, such as during vision detector setup—see below) as an "image view" on a Human-Machine Interface (HMI) for a user to view and manipulate. See FIG. 1, for example, showing a detachable or remote HMI 194 with Graphical User Interface (GUI) screen 196 and image view window 198 which displays an associated image view (300) of an object (120, for example) within the vision detector's (100) field of view. Accordingly, FIG. 3 represents an image view, showing the object 300 containing an image of a label 310 and a hole 312. The object in this example contains six visible features to be inspected, corresponding to the two exemplary Locators and four Detectors further described below.

The Locator 320 is used to detect and locate the top edge of the object, and the Locator 322 is used to detect and locate the right edge. A Brightness Detector 330 is used to help detect the presence of the object. In this example the background is brighter than the object, and the sensitivity threshold is set to distinguish the two brightness levels, with the logic output inverted to detect the darker object and not the brighter background. Together the Locators 320 and 322, and the Brightness Detector 330, provide the evidence needed to judge that an object has been detected, as further described below. A Contrast Detector 340 is used to detect the presence of the hole 312. When the hole 312 is absent the contrast would be very low, and when present the contrast would be much higher. A Spot Detector could also be used. An Edge Detector 360 is used to detect the presence and position of the label 310. If the label 310 is absent, mispositioned horizontally, or significantly rotated, the analog output of the Edge Detector would be very low. A Brightness Detector 350 is used to verify that the correct label has been applied. In this example, the correct label is white and incorrect labels are darker colors.

As the object (110 in FIG. 1) moves from left to right through the field of view of the vision detector 100, the Locator 322 tracks the right edge of the object and repositions Brightness Detector 330, Contrast Detector 340, Brightness Detector 350, and Edge Detector 360 to be at the correct position relative to the object. Locator 320 corrects for any variation in the vertical position of the object in the field of view, repositioning the Detectors based on the location of the top edge of the object. In general Locators can be oriented in any direction. A user can manipulate Photos in an image view by using well-known HMI techniques. A Photo can be selected by clicking with a mouse, and its ROI can be moved, resized, and rotated by dragging. Additional manipulations for Locators are described below.

FIG. 4 shows a logic view containing a wiring diagram corresponding to the example setup of FIG. 3. A wiring diagram shows a series of features (termed "Gadgets" in the above-incorporated METHOD AND APPARATUS) 420, 422, 430, 440, 450 and 460 being used to inspect objects and interface to automation equipment, and the connections between logic inputs and outputs of the Gadgets. A wiring diagram may be displayed on an HMI for a user to view and manipulate. A display of Gadgets and their logic interconnections on an HMI is called a logic view. A Locator 420 named "Top", corresponding to Locator 320 in the image view of FIG. 15, is connected to AND Gate 410 by wire 424. Similarly, "Side" Locator 422 corresponding to Locator 322, and "Box" Detector 430, corresponding to Brightness Detector 330, are also wired to AND Gate 410. The logic output of "Box" Detector 430 is inverted, as shown by the small circle 432, and as described above, to detect the darker object against a lighter background. The logic output of AND Gate 410 represents the level of confidence that the top edge of the object has been detected, the right edge of the object has been detected, and the background has not been detected. When confidence is high that all three conditions are true, confidence is high that the object itself has been detected. The logic output of AND Gate 410 is wired to the ObjectDetect Judge 400 to be used as the object detection weight for each frame. Since the logic input to the ObjectDetect Judge in this case depends on the current frame, the vision detector is operating in visual event detection mode. Note, when operating in external trigger mode, an Input Gadget would be wired to ObjectDetect. To operate in continuous analysis mode, nothing would be wired to ObjectDetect.

The choice of Gadgets to wire to ObjectDetect is made by a user based on knowledge of the application. In the example of FIGS. 3 and 4, a user may have determined that detecting just the top and right edges was not sufficient to insure that an object is present. Note that Locator 322 might respond to the label's left edge just as strongly as the object's right edge, and perhaps at this point in the production cycle Locator 320 might occasionally find some other edge in the background. By adding Detector 330, and requiring all three conditions by means of AND Gate 410, object detection is made reliable. In the wiring diagram, Contrast Detector "Hole" 440, corresponding to Contrast Detector 340, Brightness Detector "Label" 450, corresponding to Brightness Detector 350, and Edge Detector "LabelEdge" 460, corresponding to Edge Detector 360, are wired to AND Gate 412. The logic output of AND Gate 412 represents the level of confidence that all three image features have been detected, and is wired to ObjectPass Judge 402 to provide the object pass score for each frame.

The logic output of ObjectDetect Judge 400 is wired to AND Gate 470. The logic output of ObjectPass Judge 402 is inverted (circle 403) and also wired to AND Gate 470. The ObjectDetect Judge is set to "output when done" mode, so a pulse appears on the logic output of ObjectDetect Judge 400 after an object has been detected and inspection is complete. Since the logic output of ObjectPass 402 has been inverted, this pulse will appear on the logic output of AND Gate 470 only if the object has not passed inspection. The logic output of AND Gate 470 is wired to an Output Gadget 480, named "Reject", which controls an output signal from the vision detector than can be connected directly to a reject actuator 170 (FIG. 1). The "Reject" Output Gadget 480 is configured by a user to perform the appropriate delay (270 in FIG. 2) needed by the downstream reject actuator.

To aid the user's understanding of the operation of the exemplary vision detector 100, Gadgets and/or wires can change their visual appearance to indicate fuzzy logic values. For example, Gadgets and/or wires can be displayed red when the logic value is below 0.5, and green otherwise. In FIG. 4, wires 404 and 472 are drawn with dashed lines to indicate a logic value below 0.5, and other wires, for example wire 424, are drawn solid to indicate logic values equal to or greater than 0.5. One skilled in the art will recognize that a wide variety of objects can be detected and inspected by suitable choice, configuration, and wiring of Gadgets. One skilled in the art will also recognize that the Gadget class hierarchy of the above-incorporated-by-reference METHOD AND APPARATUS is only one of many software techniques that could be used to practice the invention.

Machine vision systems and vision detectors can be configured with focus-adjustable lenses so that a properly focused image of the object can be acquired. Typical installations require a focus adjustment step is during setup, or during operation, such as when line configuration changes are made. In prior art machine vision system implementations, a focus setting is determined while a sample object is placed in a fixed position in the field of view. If a focus adjustment is necessary subsequent to initial setup or during run-time, the machine vision system is taken off line while the focus adjustment is performed. If the system is installed on a moving production line, safety requirements typically dictate that the line be stopped for a camera adjustment such as a focus setting.

Further, if a machine vision imager is provided in a sealed housing to protect the imager components from the production environment, the housing seal must be temporarily broken to permit focus adjustment. Typically, focus adjustment of a sealed imager requires opening the housing to adjust the focus setting, and re-sealing the housing.

Vision detectors, as described above, are capable of being configured and setup on a running line. Vision detectors acquire multiple images, any one of which can be used for configuration and initial setup. Configuration and setup of a vision detector does not typically require stopping a production line once the unit is installed. However, if a focus adjustment is necessary, access to the vision detector for such an adjustment may require production line interruption.

Accordingly, a need exists for an imaging device in a machine vision system or a vision detector that permits focus adjustment without disturbing a production environment.

BRIEF SUMMARY OF THE INVENTION

This invention provides a focusing mechanism for a vision detector or machine vision system that provides the capability for remotely adjusting focus without disturbing a production environment. In one aspect of the invention, a machine vision system or vision detector is contained in a housing, with a window or protective transparent cover exposing the lens and imager. The imager and lens and window aligned on an optical axis, i.e., in optical cooperation. A lens adjustment gear or drive member is attached to the focus adjustment ring of the lens with a mating drive gear coupled to a focus adjustment shaft that protruded through the system housing. Rotation of the focus adjustment shaft externally from the housing causes a focus adjustment to be made without interfering with illumination or the physical installation of the unit.

An aspect of the invention provides for a moisture-sealed enclosure so that a focus adjustment can be made without breaking the effectiveness of the seal.

In another aspect of the invention, focus adjustment can be performed remotely from the system with the use of a torque-transmitting cable engaged at one end into the focus adjusting shaft of the system. The torque-transmitting cable, such as a sheathed cable, can be actuated remotely to cause rotation of the focus adjusting shaft to adjust the focus setting of the lens. This aspect of the invention permits focus adjustment of the system without having to be in close physical proximity to the unit, so that a user can be safely located with respect to the production environment.

In a further aspect of the invention, a drive motor is used in place of the focus adjustment shaft to actuate the focus adjustment mechanism. Control signals sent to the system cause the drive motor to rotate the drive gear mated to the lens adjustment gear. This aspect of the invention permits remote focus adjustment at a remote location from the production environment where the system is deployed.

Other objects, features, and advantages of the present invention will become apparent from the following detailed description, the accompanying drawings, and the appended claims.

BRIEF DESCRIPTION OF THE SEVERAL VIEWS OF THE DRAWINGS

The invention description below refers to the accompanying drawings, of which:

FIG. 6 is a front view of the vision detector of FIG. 5;

FIG. 7 is a side cross section of the vision detector taken along line 7-7 of FIG. 6;

FIG. 14 is a partial sectional view of a focus adjustment cable according to an embodiment of this invention; and FIG. 15 is an exploded view of the vision detector of FIG. 5 according to an alternate embodiment of this invention showing, in further detail, an alternate mechanism for focusing the lens.

DETAILED DESCRIPTION OF THE INVENTION

Figure 1:
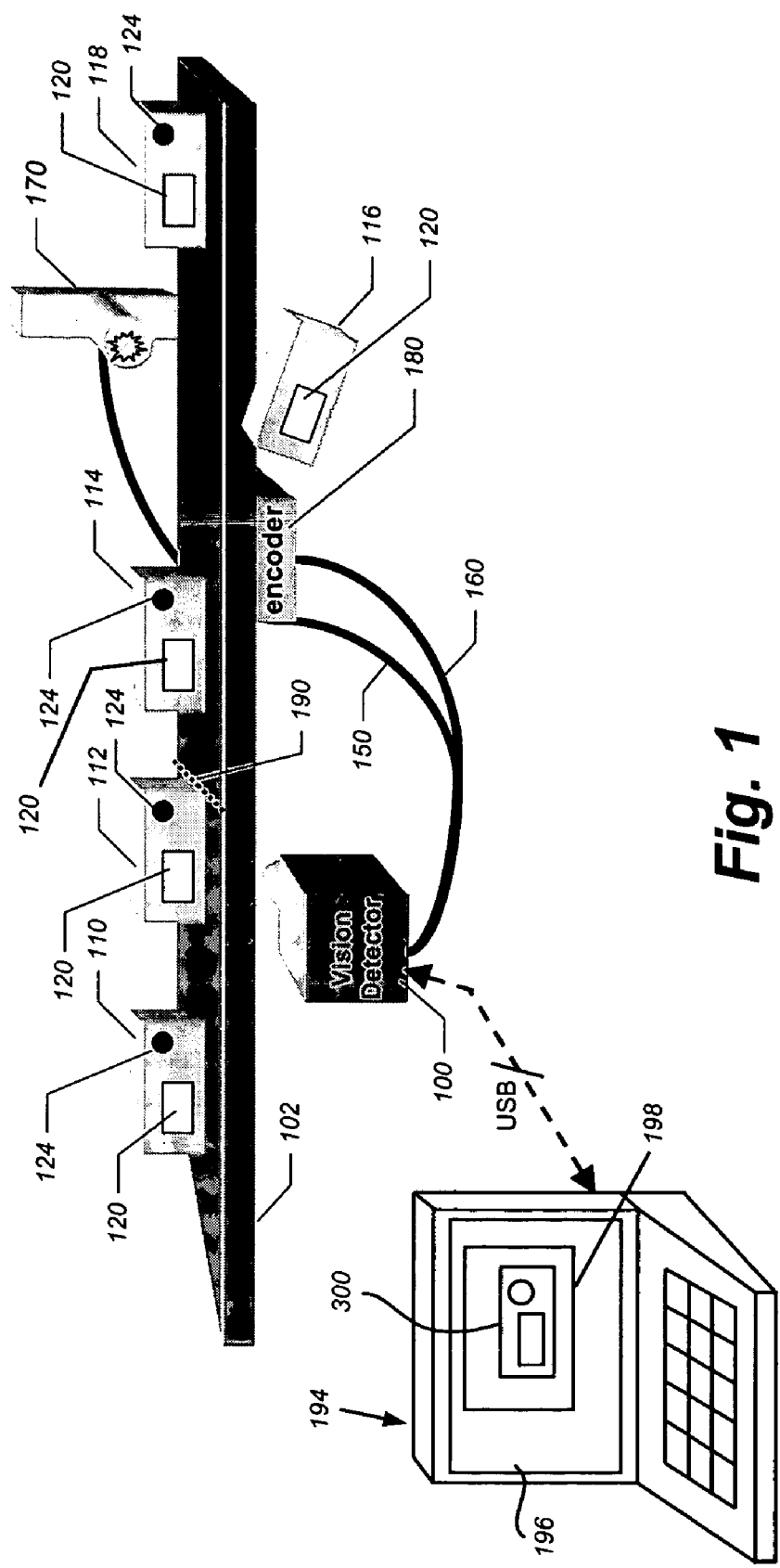
FIG. 1, already described, is a schematic perspective view of an exemplary implementation of a vision detector, inspecting objects on a production line.
Figure 2:
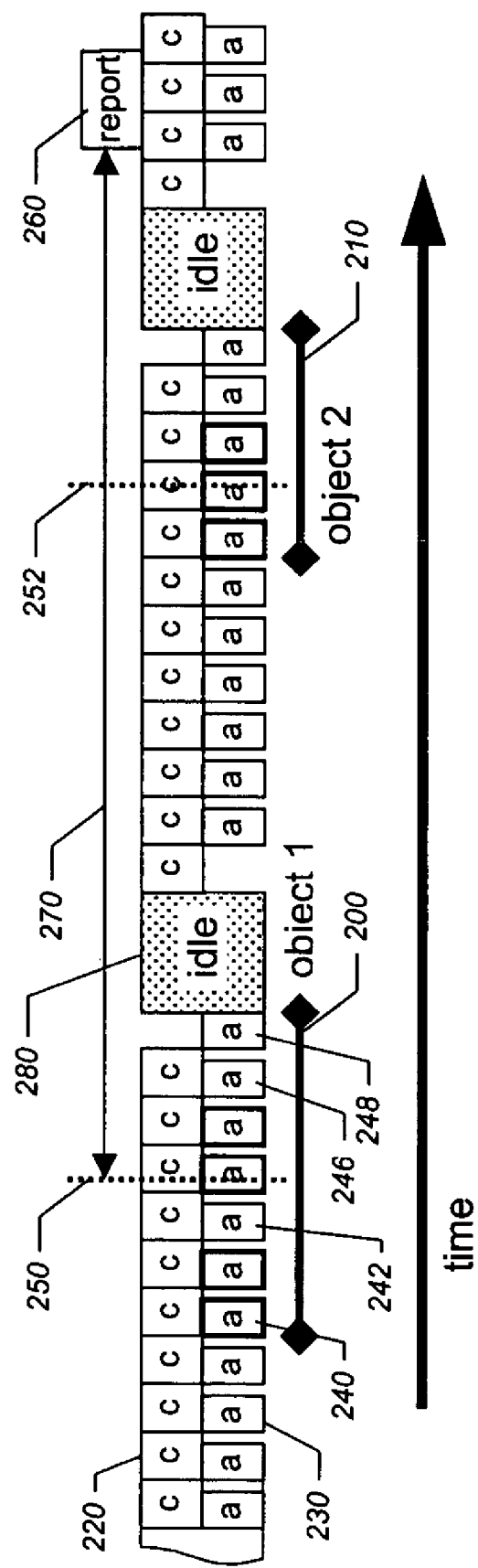
FIG. 2, already described, is a timeline that illustrates a typical operating cycle for the exemplary vision detector of FIG. 1 using visual event detection.
Figure 3:
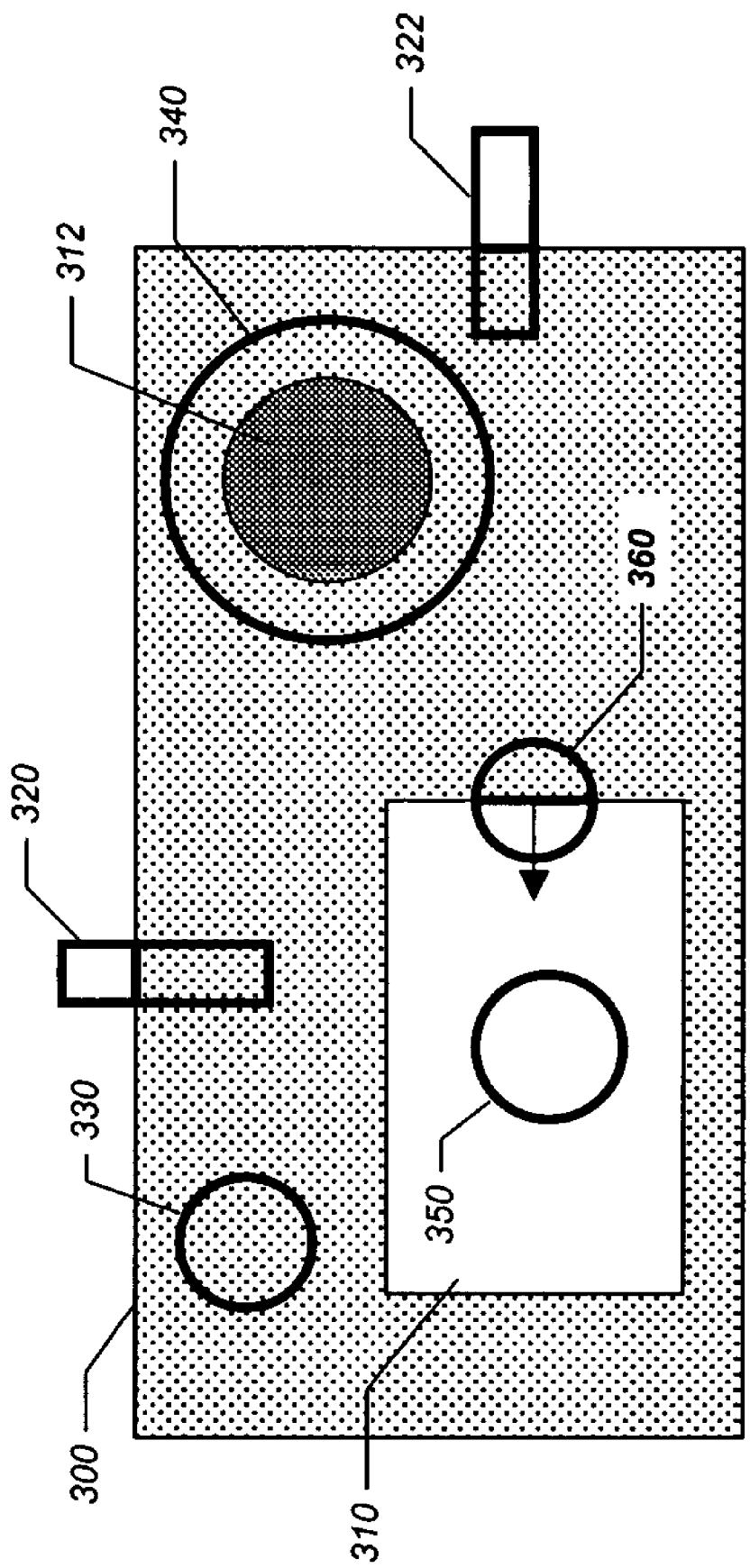
FIG. 3, already described, is an image of an exemplary configuration of the vision detector of FIG. 1 that may be used to inspect an exemplary object.
Figure 4:
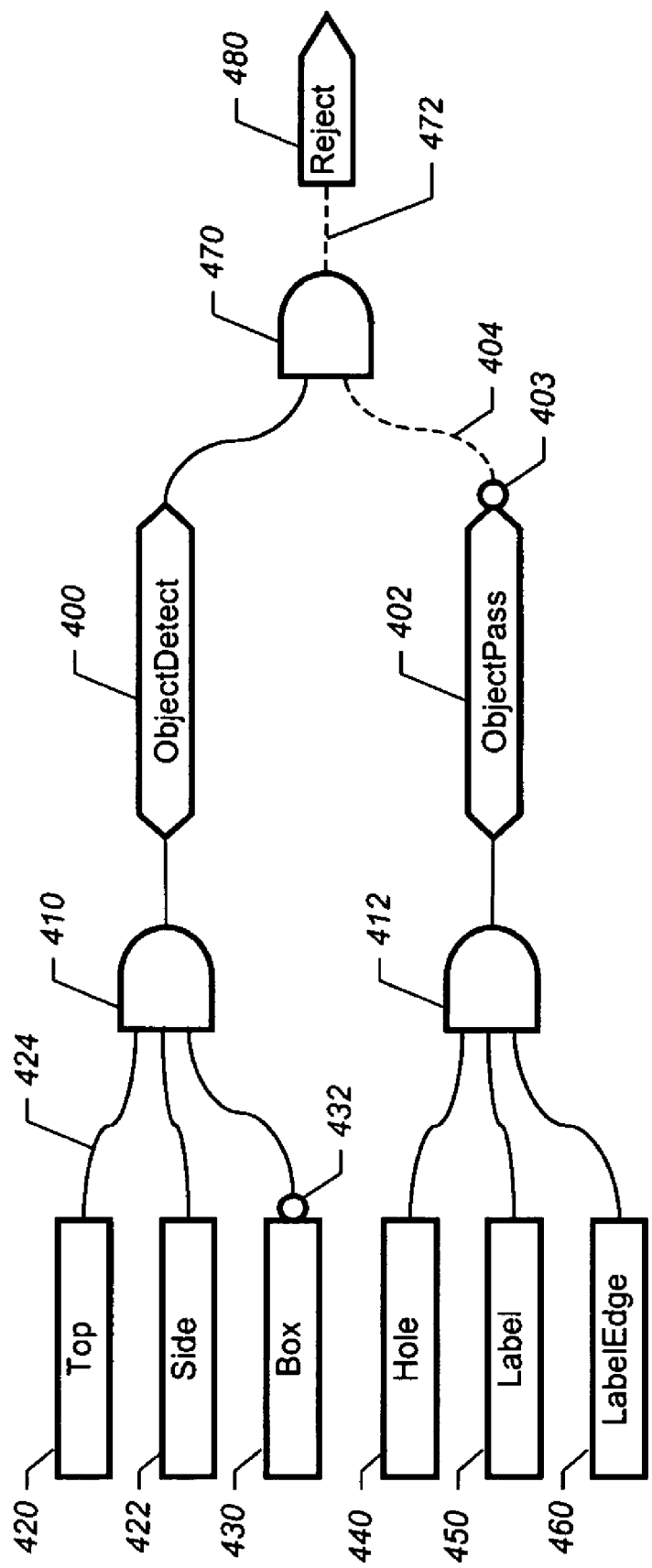
FIG. 4, already described, is a logic diagram of another portion of the configuration corresponding to the exemplary setup of FIG. 3.
Figure 5:
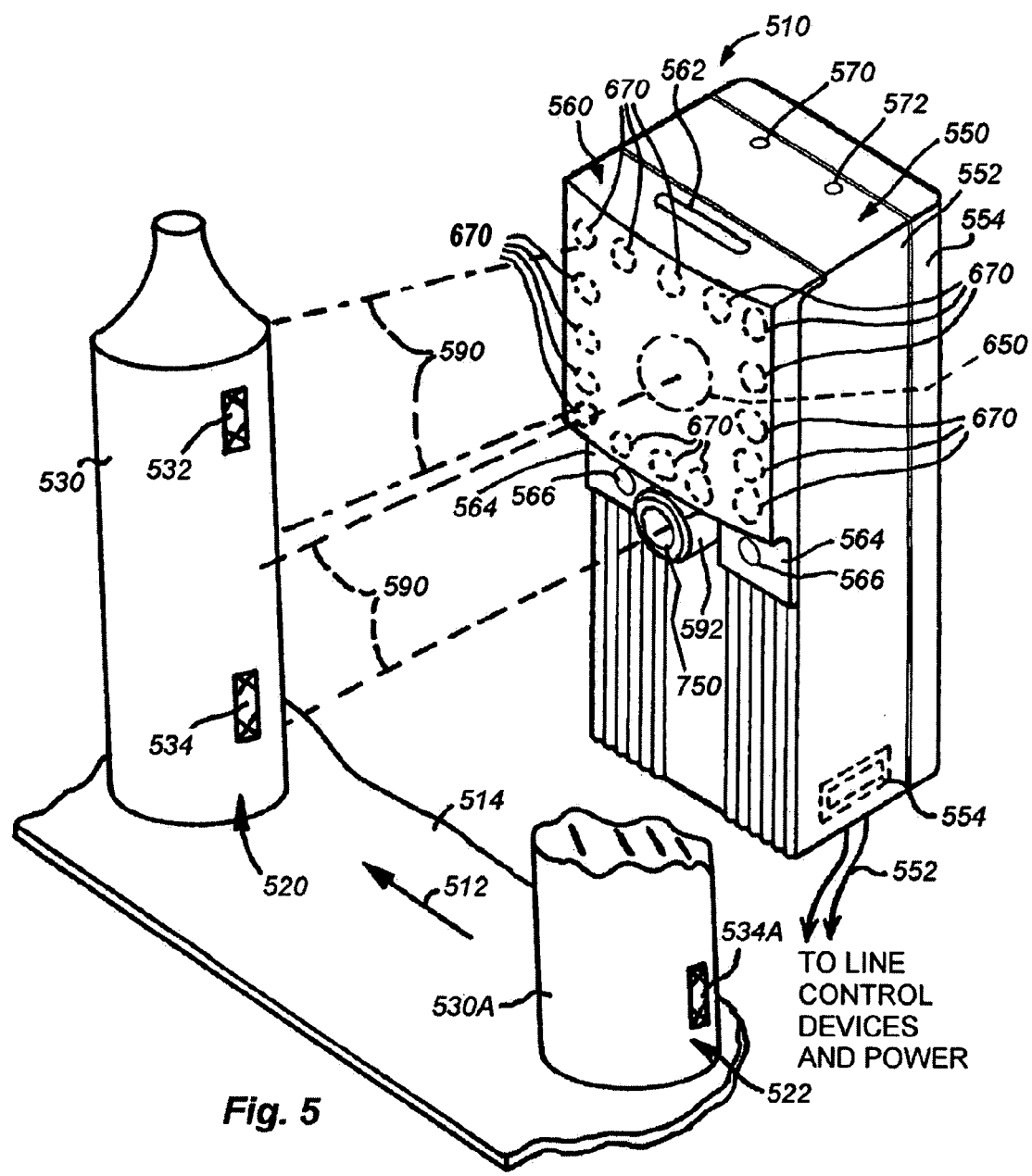
FIG. 5 is a perspective view of a vision detector, including a housing with a rectangular illuminator according to an illustrative embodiment, located on a production line to detect and inspect objects.

A vision detection and inspection apparatus (termed "vision detector" herein) 510 is shown in FIG. 5. The vision detector 510 of this illustrative embodiment functions generally in accordance with principles described in the above-incorporated-by-reference METHOD AND APPARATUS FOR VISUAL DETECTION AND INSPECTION OF OBJECTS, by William M. Silver, and summarized above in connection with the exemplary vision detector 100 (FIG. 1). In this illustration, the vision detector 510 of the illustrative embodiment is mounted along a moving (arrow 512) production line characterized by a conveyor 514. Alternatively, the line can be stationary and the vision detector may move. In any case, there is a relative motion between objects on the line and the vision detector 510. The production line features a stream of manufactured objects 520 and 522 each passing through the field of view of the vision detector 510 in succession. In this illustration the object 520 is presently in the field of view of the vision detector 510. In this example, the object 520 includes an edge 530 and at least two indicia 532 and 534. The edge 530 provides one possible basis for the above-described "Locator" (see, for example, edge elements 320 and 322 in the image view of FIG. 3 and the respective Gadgets 420 and 422 in the logic view of FIG. 4), while, the indicia 132, 134 provide the basis for two respective "Detectors" in an associated image view and logic view (see, for example, hole and label elements 340 and 350 in FIG. 3 and respective Gadgets 440 and 450 in FIG. 4), upon which presence/location of the object is determined and inspection for faults is based. Note that the follow-on object 522 is cut-off, thereby (potentially) allowing location to be determined via the remaining edge 530A, and providing one expected lower indicia 534A but depriving the vision detector 510 of the second, upper indicia (532 in object 520). Hence this follow-on object 522 will be judged to fail by the vision detector, and appropriate rejection steps will ensue. The vision detector 510 is generally contained within a moisture resistant housing 550 that can be mounted on brackets or other fixtures and directed at a location along the line. All runtime image capture and analysis functions are carried out by an on-board imager, memory and processor, such as that described in the above-incorporated-by-reference METHOD AND APPARATUS FOR VISUAL DETECTION AND INSPECTION OF OBJECTS. Outputs from the vision detector and power are carried by a line 552 exiting the bottom (for example) of the housing 550. The vision detector can be programmed during setup using a HMI such as a laptop PC interconnected by an appropriate cable using a bus protocol such as Universal Serial Bus (USB). A cable connection 554 (shown in phantom along the housing bottom) can be provided to the housing 550 for such an HMI interconnect when needed.

With further reference to the front view of FIG. 6, the vision detector housing 550 defines a generally rectangular box that is sealed against moisture infiltration in accordance with applicable industrial and/or military standards. The housing 550 can be constructed in two sections 582 and 584 that are assembled in clamshell fashion with appropriate sealing members (not shown), and can be fabricated from a variety of materials (or combination of materials including metal, a durable polymer or composite. The front side of the housing 550 includes an aperture 610, over which is placed a clear or translucent glass or polymer window 560. The window 560 in this embodiment defines a slight outwardly convex curve, but is optically non-distorting or magnifying. The cover 560 is formfitting with respect to the housing for a clean-lined appearance. The top side of the window 560 includes a slot that seats in a linear shoulder 562 on the housing 550. This secures the top of the cover 560 tightly against the housing 550 and allows it to be removed by generally hinging it up (dashed arrow 710 in FIG. 7) and out of the shoulder 562. The bottom end of the cover 560 includes a plate 564 with a pair of mounting holes 566, into which are placed threaded fasteners 620 that secure the bottom of the cover 560 tightly against the housing 550. A peripheral seal 712 (see FIG. 7) is provided between the window 560 and housing 550 to further enhance a liquid-resistant joint therebetween.

The lower side of the housing 550 includes a sealed cable 630 for carrying the link (552 in FIG. 5) to responsive devices such as a fault alarm, rejection arm or line shut-down control. It also carries power to the vision detector 510 for processor, imager and illumination functions. A pair of LED-driven indicators 570 and 572 are provided to the top of the housing 550. In an exemplary embodiment, one indicator 570 can act as a run-time power-on and off-line setup indicator. That is, during power-on the indicator light constant green and during setup it flashes green. The other indicator 572 can act as a fault indicator. When a faulty object is observed, the indicator lights red. While two indicators a 570 and 572 are described in this embodiment, a variety of types and colors/flash patterns of indicators are expressly contemplated according to alternate embodiments. Such indicators can signal a number of different status and fault conditions.

Centered within the upper aperture 610 is the lens 650, which focuses light on an imager. This lens 650 is aligned along a camera axis 660. Also arranged in a rectangular pattern around the lens 650 and associated axis 660 is an array of discrete LEDs. In this embodiment, commercially available 2-milliwatt red LEDs are employed. It is desirable that the LEDs be inexpensive and yet bright enough to allow short shutter times. In an illustrative embodiment, high-intensity red LEDs operating at 630 nanometers are used, for example the HLMP-ED25 manufactured by Agilent Technologies. However, LEDs characterized by a variety of types, colors and power-outputs are expressly contemplated according to alternate embodiments. In another embodiment, high-intensity white LEDs are used to implement desired illumination.

Figure 8:
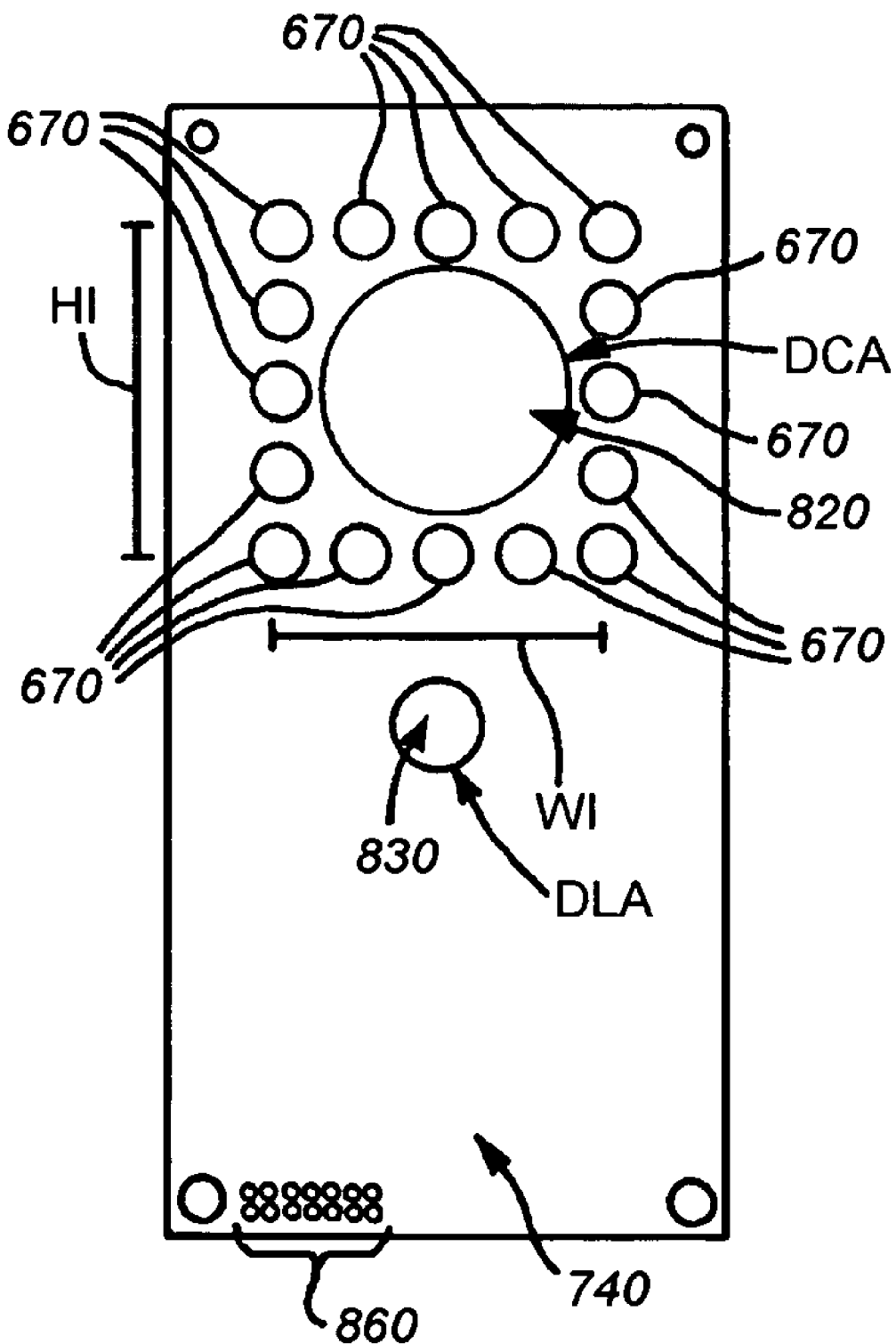
FIG. 8 is a plan view of an exemplary circuit board for mounting the illuminator of the vision detector of FIG. 5.

The LEDs in this embodiment are arranged as a geometric rectangle having the axis 660 as their relative center. The LEDs are arranged as a pair of vertical columns (dashed center lines 672 and 674) and two horizontal rows (dashed center lines 676 and 678) with the rows 672, 674 and columns 676, 678 meeting at right angles with respect to each other to form a rectangle or square, as shown. The rectangular/square LED array is defined by five LEDs (670) per side, with the end LEDs on each side defining a corner with an adjacent side. That is there is a corner LED at each corner and three central LEDs on each side between corners. The number and placement of LEDs in the rectangular/square array is only exemplary and other arrangements and numbers of LEDs per side are expressly contemplated. For example a rectangle in which two parallel sides (rows or columns) are longer than another pair of perpendicular parallel sides (columns or rows) is expressly contemplated. Referring briefly to FIG. 8, in the exemplary embodiment, the relative center-to-center spacing SL between each LED 670 is approximately 0.3 inch. The overall size for the array between corner LED centers is defined by width WI of approximately 1.2 inches and a height HI also of approximately 1.2 inches.

As shown generally in the above-described FIG. 5, the illumination pattern (dashed lines 590) generally defines a rectangle as shown that washes over the object 520 in a manner that conforms well to the rectangular field of view employed by the imager herein. Hence, lighting of edges and other object features through a number of angular positions (achieved as a plurality of successive images of the moving object are captured) is superior to that obtained using a circular ring illuminator.

With reference to FIG. 7, the housing 550 is shown in cross section. The housing 550 encloses a circuit board 740 upon which the array of LEDs 670 is mounted. This board includes an aperture 820 through which passes the lens 650. The aperture 820 is approximately 0.875 inch in diameter. The size of the aperture 820 can be set to the relative outer diameter of the lens. The base 744 of the lens overlies an "imager," such as a charge-coupled device (CCD) or CMOS image element having the high-frame rate, low-resolution capabilities discussed above. The lens 650 is adjustable for focus via a manual adjustment system using and external rotating adjustment shaft 750 having a central formation for receiving a tool end, such as a screwdriver blade or hex wrench, that allows the shaft 750 to rotate. A gear 752 is mounted on the inner end of the shaft 750. This gear 752 meshes with a peripheral gear (described below) on the lens base 744. Rotating the lens base's peripheral gear causes the focus ring (not shown) of the lens 650 to turn. The shaft passes through an aperture 730 (FIG. 7) in the circuit board 740 and is seated in a raised well 592 on the housing 550 centered below the window 560 and bisecting the window's bottom plate 564. As shown in FIG. 7, the shaft 750 is rotatably sealed using an O-ring 770 or similar sealing device. In this manner, all focus adjustments can be handled internally, without exposing the internals of the vision detector 510 to the environment.

According to one embodiment, the surface of the illuminator board 740 in the area of the lens 650 and LEDs 670 (which is visible through the window 560) is colored black or another opaque color. This provides a pleasing visual effect and also reduces returned glare from the board surface.

The illuminator circuit board 740 is spaced from a lower sensor board 780, upon which the vision detector's imager (also termed a "sensor"), memory, processor and other operative components 782 (shown in phantom) reside. The base 744 of the lens is also physically mounted on the sensor board 780. A variety of spacers and mounts can be provided to space the boards 740 and 780 from each other, and to maintain their relative positions within the housing 550. The illuminator board 740 also includes a multi-pin connector lead 860 that allows the LEDs to be connected with the driver and processor on the sensor board 780. In addition, the sensor board 780 supports the bus connector 790 that interfaces the vision detector with an HMI for setup and testing. The connector 790 can be linked with the sensor board 780 via a link 792 that may be of conventional design.

Figure 9:
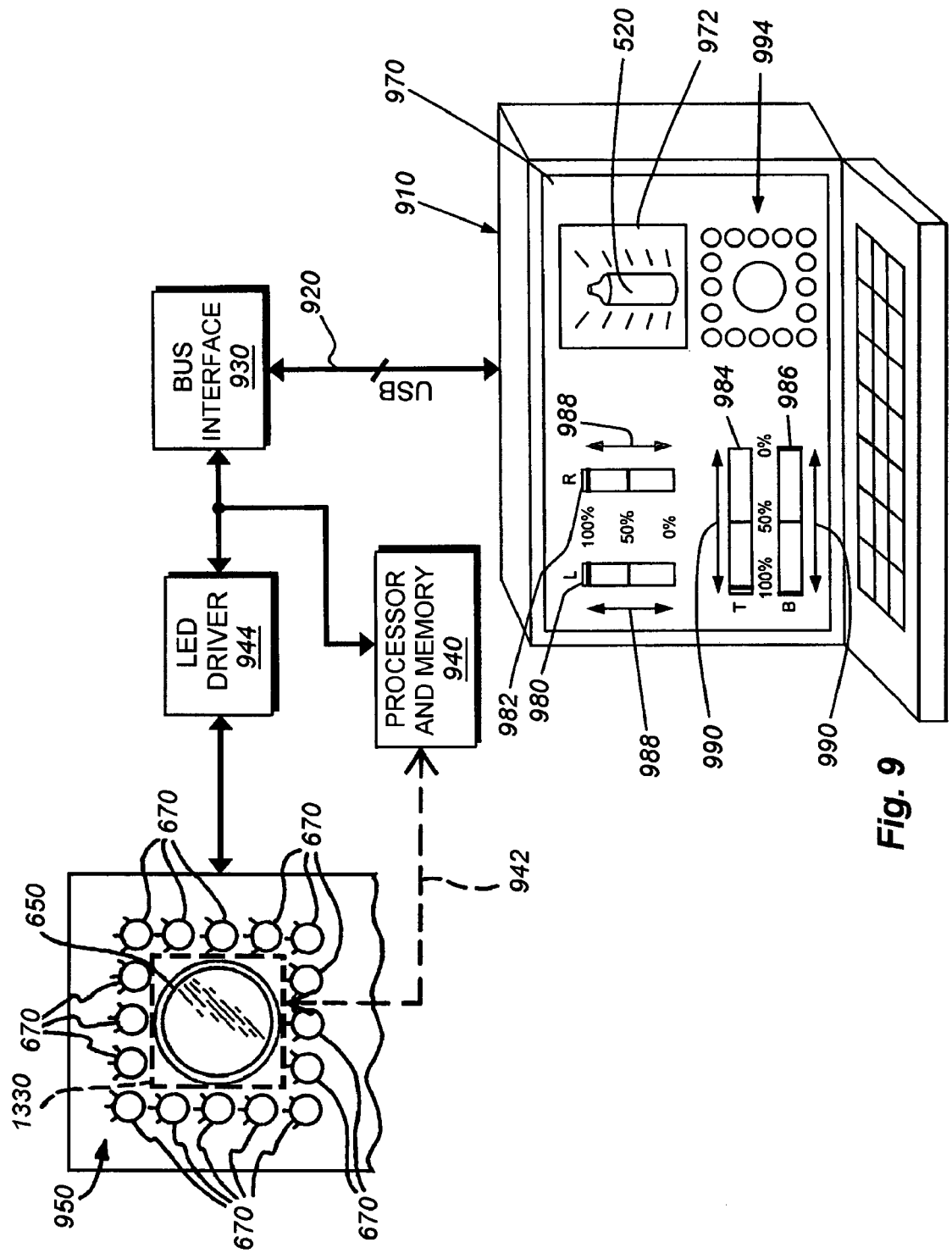
FIG. 9 is a schematic diagram of a control arrangement for the machine vision detector of FIG. 5 including a removable Human-Machine Interface (HMI) for programming the illuminator.

Referring now to FIG. 9, the operation of the illuminator is described in further detail. In this illustration the vision detector is in setup mode with an HMI (laptop PC 910) interconnected via the bus 920 to an onboard bus interface 930 of conventional design. The bus interface communicates with the vision detector's processor and memory (for example, RAM and EEPROM and/or FLASH) 940. The processor and memory 940 connects (dashed line 942) to the imager 1330 (shown in phantom below the lens 650) and also to an LED driver 944 of conventional design. In this embodiment, the driver controls four individually addressable banks in the overall array 950, one pair of banks defining each vertical column of three LEDs between the corner LEDs (that are subsumed by the rows) and the other pair of banks defining each five horizontal row LEDs (including the corners). The precise arrangement of LEDs and the number of individually addressable banks are highly variable. In addition, according to an alternate embodiment, the array's corner LEDs may be controlled so that they light both when vertical column or horizontal row containing the corner is individually illuminated so that both rows and columns can be fully lit across their entire span.

The HMI 910 in this example includes a Graphical User Interface (GUI) 970 that includes a generalized illumination setup control screen as shown. The screen can include a real-time display or view 972 of the current object (520) and can provide the user feedback as to effective illumination patterns.

In this embodiment, the illumination control screen of the GUI 970 also includes a set of (graphical) control slides 980, 982, 984 and 986. As shown, the slides control respective left and right vertical columns (slides 980 and 982) and upper and lower horizontal rows (slides 984 and 986) of the illuminator array. The slides in this embodiment include three settings as shown 0% (off), 50% (half power) and 100% (full power). The slides are moved by clicking on them and moving them (double arrows 988 and 992) to the appropriate position. The results of the selections on the slides are mirrored on the illuminator mockup 994 on the display screen. Various colors or indicia (e.g. large X's) can be use to designate un-powered LEDs or half-powered LEDs. Similarly, the results of the slide settings will be visible on the display 972 of the actual object under test (520) as the LED array 950 responds to the input settings by varying the lighting profile on the object.

Figure 10:
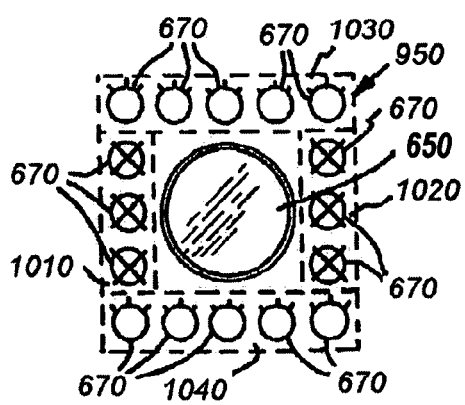
FIG. 10 is a schematic plan view of the illuminator showing selective illumination of horizontal LED lines.
Figure 11:
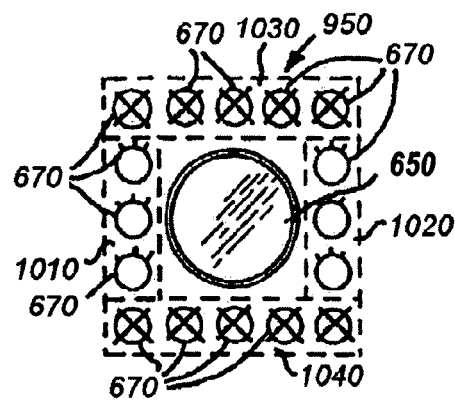
FIG. 11 is a schematic plan view of the illuminator showing selective illumination of vertical LED lines.
Figure 12:
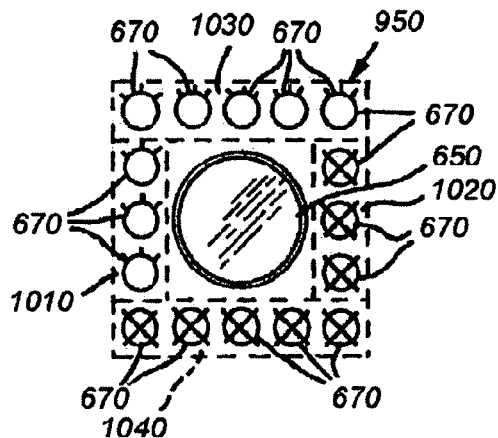
FIG. 12 is a schematic plan view of the illuminator showing selective illumination of one horizontal LED line and one vertical LED line.

FIGS. 10, 11 and 12 detail three exemplary lighting arrangements that can be achieved by controlling the LED array 950 via the HMI. In FIG. 10, the vertical columns 1010 and 1020 of LEDs have been shut off, illuminating only the horizontal rows 1030 and 1040. This would result in a pattern that provides greater lighting to the top and bottom sides, across the width of an object and less lighting along vertical edges.

In FIG. 11, the vertical columns 1020 and 1020 are lit, while the rows 1030 and 1040 are un-powered. This tends to emphasize the object's vertical sides (if any) while dimming the region of the width.

In FIG. 12, the left vertical column 1010 and top row 1030 are lit, while the right column 1020 and bottom row 1040 are un-powered. This arrangement would bias the light toward the upper corner of the object. A number of other patterns can be achieved, such as U-shaped patterns with three banks powered and patterns in which some banks are fully powered (100%) and other are partially (50%) powered. The pattern that attains the best lighting for acquiring and analyzing Locators and Detectors is generally chosen by the user.

As described briefly above, the lens 650 includes a focusing mechanism that is adjusted by rotating an externally projecting shaft 750. With further reference to the exploded view of FIG. 13, the shaft 750 terminates with a gear 752 that is aligned axially to mesh with a lens adjustment gear 1310. The lens adjustment gear is fixedly mounted to the conventional rotating focus ring 1312 provided to the lens base 744. Note that the shaft includes a slot 1314 for receiving a screwdriver/tool blade and an annular recess for receiving a sealing O-ring as described above.

Alternative gear drive configurations are also expressly contemplated within the scope of the invention. For example, the externally projecting shaft 750 can be oriented to project through any face of the housing 550, with the appropriate drive gear modifications, such as a pinion gear or right angle drive. Further, alternative drive methods, such as belt and/or chain drive mechanisms are also expressly contemplated within the scope of the invention.

In an alternate embodiment, a focus adjustment cable 1410 can be used to actuate a remote focus adjustment of the detector 510 as shown in partial section in FIG. 14. The focus adjustment cable 1410 is a sheathed cable having a torque transmitting center cable 1440 captured within sheathing 1430. An adjustment knob 1450 on one end of the cable 1410 is fixedly attached to the center cable 1440 while rotatable with respect to the sheathing 1430. A spade cable end 1420 is fixedly attached to the center cable 1440 while rotatable with respect to the sheathing 1430. The spade cable end 1420 has a mesh fit with the slot 1314 of the externally projecting shaft 750. When the cable end 1420 is inserted into the slot 1314, remote focus adjustment can be actuated by rotating the focus adjustment knob 1450 at a location remote from the vision detector 510.

An alternate embodiment of the focusing mechanism is shown in FIG. 15. A gear-reduced servo motor 1410 is used to drive the gear 752. Control of the servo-motor 1410 is performed through signals (not shown) from the processor and other operative components 782 according to input from a remote user via cable connection 554. Signals actuating the servo-motor 1410 will cause the gear 752 to rotate in a desired direction, causing the lens adjustment gear 1310 to rotate, thereby changing the focus setting of the lens 650. In this embodiment, the raised well 592 on the front housing section 582 is sealed shut since manual focus adjustment is not needed.

Figure 13:
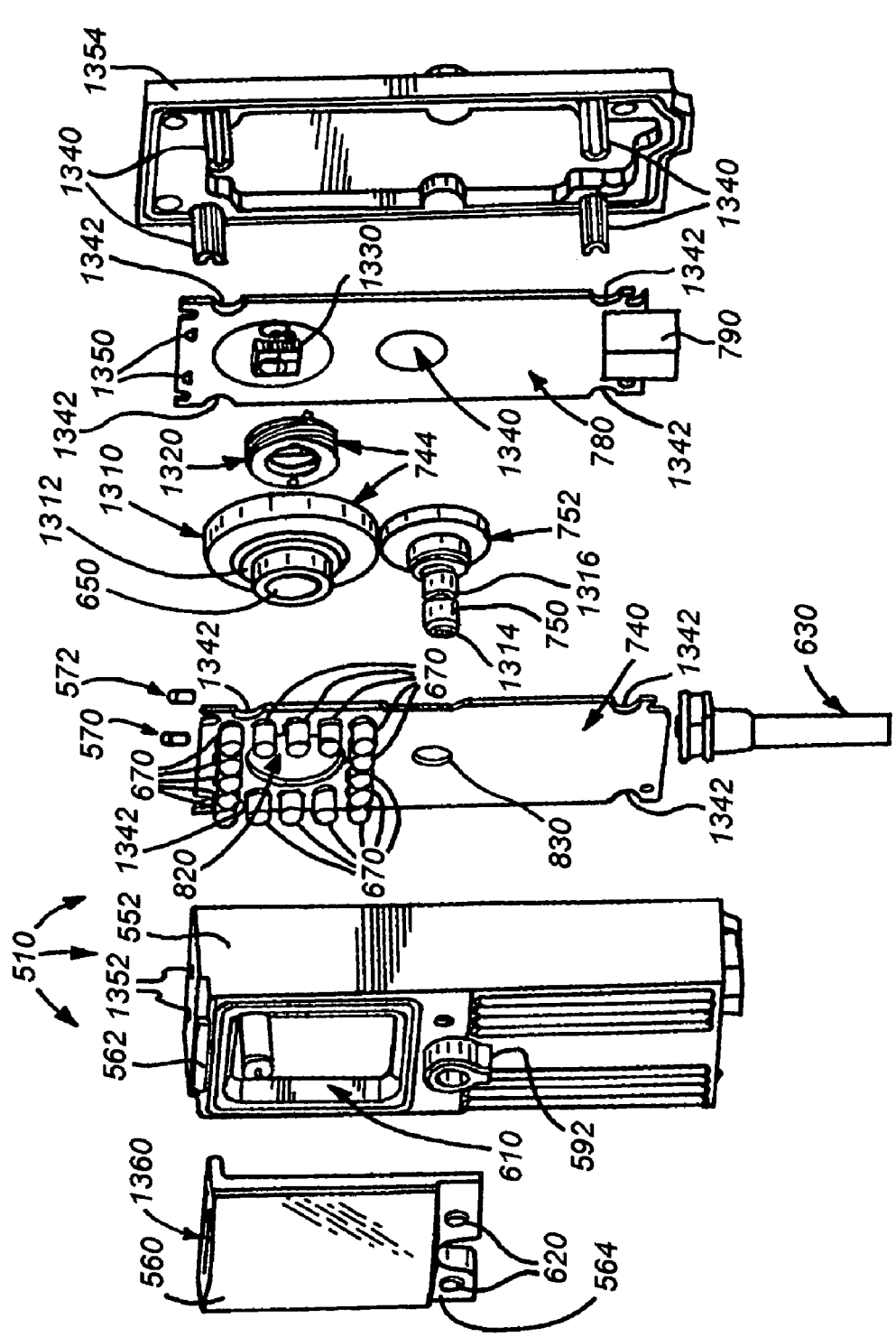
FIG. 13 is an exploded view of the vision detector of FIG. 5 according to an embodiment of this invention showing, in further detail, the mechanism for focusing the lens.

With further reference to the exploded view of FIG. 13, the lens 650 is mounted on a lens mount 1320 that provides proper spacing with respect to the board-mounted imager 1330. The sensor board also includes an aperture that is sized and arranged to provide a rotary bearing structure for the far end of the shaft 750 and gear 752. Note that the rear half 584 of the housing 550 includes half-cylinder posts 1340 that engage cutouts 1342 in each of the boards 740 and 780. In this manner the boards 740 and 780 remain properly aligned when assembled into the housing. Note also that the two indicators 570 and 572 are light pipes that receive transmitted light from small LEDs 1350 mounted on the sensor board 780 and extend through holes 1352 in the housing top. Also, more clearly visible is the slot 1360 in the transparent/translucent window that engages the shoulder 562 formed in the top of the housing. Finally, it should be clear that each board 740 and 780 can contain appropriate circuit traces for connecting various electronic components and connectors for electronically connecting the boards to each other and to external devices. Like-wise, appropriate physical spacers can be provided in the housing to maintain a proper spacing between the boards and between each board and the housing.

The foregoing has been a detailed description of illustrative embodiments of the invention. Various modifications and additions can be made without departing from the spirit and scope thereof. For example, while a rectangular field of view/interest is contemplated for the imager and an associated rectangular illuminator is provided, it is contemplated that the field of view and/or illuminator can be defined as a multi-sided, non-rectangular polygon in alternate embodiments, and the banks of the array can be individually addressable along lines of the polygon. The field and/or illuminator can include curvilinear segments as well with appropriate illuminator banks to accommodate such segments. Also, while discrete LEDs are used in this example, other acceptable lighting sources, that allow an illumination line to be defined are expressly contemplated. Further, while a sealed adjustment mechanism for lens focus is provided to the housing, it is contemplated that such a geared sealed system can be employed to activate other lens functions such as zoom and/or aperture. Finally, while terms such as top, bottom vertical and horizontal are used herein, these terms are meant to be exemplary only and provide the reader with relative orientations. The actual orientation of any element described herein is variable. Accordingly, this description is meant to be taken only by way of example and not to otherwise limit the scope of the invention.

We claim:

1. A machine vision image acquisition system comprising:
a housing having a window;
an imager mounted within the housing;
a lens in optical cooperation with the imager and the window, the lens having a focus adjustment ring to provide a focus adjustment, the lens mounted within the housing;
a lens adjustment gear fixedly mounted to the focus adjustment ring;
a drive gear in mesh with the lens adjustment gear; and
a focus adjustment shaft fixedly attached to the mesh gear and protruding through the housing to permit focus adjustment of the lens external to the housing.

2. The system according to claim 1 wherein the housing having a window is sealed against moisture infiltration.

3. The system according to claim 2 wherein the focus adjustment shaft further comprises a seal between the shaft and the housing where the shaft protrudes through the housing.

4. The system according to claim 2 wherein the window is removable, and further comprising a seal between the window and the housing.

5. The system according to claim 1 wherein the window is removable.

6. The system according to claim 1 further comprising any array of illuminators within the housing and in optical cooperation with the window and the lens so as to provide illumination that is reflected from an object onto the imager.

7. The system according to claim 6 wherein the array of illuminators are peripherally arranged about the lens.

8. The system according to claim 1 further comprising a torque transmitting cable having two distal ends, the first distal end engaged in the focus adjustment shaft, the second distal end terminating at a location remote from the housing so that rotation of the torque transmitting cable causes rotation of the focus adjustment shaft.

9. The system according to claim 8 wherein the torque transmitting cable is a sheathed cable.

10. A machine vision image acquisition system comprising:
a housing having a window;
an imager mounted within the housing;
a lens in optical cooperation with the imager and the window, mounted within the housing, the lens having a focus adjustment ring to provide a focus adjustment;
a lens adjustment gear fixedly mounted to the focus adjustment ring;
a drive gear in mesh with the lens adjustment gear;
a drive motor coupled to the mesh gear configured to permit focus adjustment of the lens external to the housing;
an array of illuminators within the housing and in optical cooperation with the window and the lens so as to provide illumination that is reflected from an object onto the imager.

11. The system according to claim 10 wherein the housing having a window is sealed against moisture infiltration.

12. The system according to claim 10 wherein the window is removable.

13. The system according to claim 12 wherein the window is removable, and further comprising a seal between the window and the housing.

14. The system according to claim 10 wherein the array of illuminators are peripherally arranged about the lens.

15. The system according to claim 10 wherein the array of illuminators comprise light emitting diodes.

16. The system according to claim 10 wherein the array of illuminators are arranged in a rectangle.

17. A vision detector comprising:
a housing having a window;
an imager mounted within the housing;
a lens in optical cooperation with the imager and the window, the lens having a focus adjustment capability, the lens mounted within the housing;
a focus means for adjusting a focus setting external to the housing; and
an array of illuminators within the housing and in optical cooperation with the window and the lens so as to provide illumination that is reflected from an object onto the imager.

18. The vision detector according to claim 17 wherein the housing having a window further comprises a sealing means for providing a moisture-sealed environment within the housing.

19. The vision detector according to claim 17 wherein the housing having a window is sealed against moisture infiltration.

20. The vision detector according to claim 17 wherein the array of illuminators are peripherally arranged about the lens.

* * * * *